US011961729B2

(12) United States Patent
Hauschild et al.

(10) Patent No.: US 11,961,729 B2
(45) Date of Patent: Apr. 16, 2024

(54) LONGITUDINAL TOOL FOR CLEANING ION OPTIC MULTIPOLE DEVICES

(71) Applicant: Thermo Fisher Scientific (Bremen) GmbH, Bremen (DE)

(72) Inventors: Jan-Peter Hauschild, Weyhe (DE); Amelia Corinne Peterson, Bremen (DE); Aivaras Venckus, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 447 days.

(21) Appl. No.: 16/875,900

(22) Filed: May 15, 2020

(65) Prior Publication Data

US 2020/0373137 A1 Nov. 26, 2020

(30) Foreign Application Priority Data

May 20, 2019 (GB) ..................................... 1907055

(51) Int. Cl.
*H01J 49/06* (2006.01)
*B08B 9/043* (2006.01)
*H01J 49/42* (2006.01)

(52) U.S. Cl.
CPC .......... *H01J 49/063* (2013.01); *B08B 9/0436* (2013.01); *H01J 49/4255* (2013.01)

(58) Field of Classification Search
None
See application file for complete search history.

(56) References Cited

U.S. PATENT DOCUMENTS

2010/0163074 A1* 7/2010 Hansen .................. A61B 90/70 134/8

FOREIGN PATENT DOCUMENTS

| | | | |
|---|---|---|---|
| CN | 1313738 | A | 9/2001 |
| CN | 202174091 | U | 3/2012 |
| CN | 203088023 | U | 7/2013 |
| CN | 205492991 | U | 8/2016 |
| CN | 207898181 | U | 9/2018 |
| CN | 109070152 | U | 12/2018 |
| DE | 202016005151 | U | * 10/2016 |
| GB | 283460 | A | 1/1928 |
| WO | WO-8900058 | A1 | 1/1989 |

OTHER PUBLICATIONS

AB SCIEX, "Instrument Front-End Cleaning Procedure," AB SCIEX [online] available from: https://sciex.com/mwginternal/de5fs23hu73ds/progress?id=wxz72lrSpCKJzTtUaMeSC8LDHC19iK6gWzkjYzK2JCI [accessed Oct. 21, 2019], Oct. 2013, pp. 26-30 & 34.

(Continued)

*Primary Examiner* — James Choi

(57) ABSTRACT

A cleaning device for cleaning electrodes of an ion optical multipole device comprises at least one substantially longitudinal cleaning section, at least one handling section extending axially from the at least one cleaning section and at least one direction section extending axially from the at least one cleaning section. The at least one cleaning section has a larger cross section than the at least one handling section. The at least one direction section is capable of allowing a longitudinal movement of the cleaning device in a first axial direction and resisting a longitudinal movement of the cleaning device in a second, opposite axial direction.

26 Claims, 7 Drawing Sheets

(56) References Cited

OTHER PUBLICATIONS

Combined Search and Examination Report dated Oct. 24, 2019, to GB Patent Application No. 1907055.6.
Scientific Instrument Services (SIS), "Mass Spectrometry Cleaning Supplies Swabs and Applicators," SIS [online] available from: https://www.sisweb.com/lab/swabs.htm [accessed Oct. 21, 2019], webpage relevant.
First Office Action dated Mar. 9, 2022, to CN Patent Application No. 202010402662.7.

* cited by examiner

LONGITUDINAL TOOL FOR CLEANING ION OPTIC MULTIPOLE DEVICES

PRIORITY

This application claims priority to UK Patent Application 1907055.6, filed on May 20, 2019, and titled "Cleaning Ion Optic Multipole Devices," by Hauschild et al., which is hereby incorporated herein by reference in its entirety.

FIELD OF THE INVENTION

The present invention relates to a device and method for cleaning ion optic multipole devices. More in particular, the present invention relates to a device for cleaning electrodes of ion optic multipole devices, such as quadrupole devices, without taking the multipole device apart or even removing any housing of the multipole device.

BACKGROUND OF THE INVENTION

Many types of mass spectrometers comprise at least one ion optic multipole device for guiding and filtering ions. Typically, such a multipole device is a quadrupole device having four parallel elongate electrodes arranged symmetrically around a central axis. Other multipole devices are also known, for example hexapole devices and octopole devices, having six and eight parallel elongate electrodes respectively. The surfaces of the parallel electrodes define an internal space or internal channel through which ions may be guided.

The DC and AC voltages applied to the electrodes of a multipole device induce electrical fields which allow ions having a certain m/z (mass-to-charge) ratio to pass through the multipole device while blocking other ions, thus forming a so-called mass filter. The blocked ions may hit the electrodes and gradually build deposits on the electrodes. In the case of transport multipoles or ion traps, the deposits can also be created by the limited acceptance or the radial ejection of ions. That is, deposits can build up at the entrance region or exit region of the multipole device, including any exit slits. It will be clear that such deposits negatively influence the proper functioning of the multipole device. It is therefore necessary to regularly clean a multipole device.

It is known to disassemble a multipole device and to clean the electrodes individually, for example by immersing them in a liquid and rubbing them with a brush or other cleaning tool. Laser cleaning has also been proposed. However, these methods have the disadvantage that after reassembly, the electrodes of the multipole device have to be realigned to ensure the proper functioning of the device. This realigning needs to be done by an expert technician and cannot be carried out by a typical mass spectrometer user. Immersion of the electrodes into a liquid has the additional disadvantage that it is difficult to remove the liquid from any holes in the electrodes. Furthermore, the reassembly of a multipole device may lead to mechanical damage to the electrodes.

It is therefore desired to be able to clean a multipole device, such as an ion optics multipole device, without taking it apart and without immersing it into a liquid.

SUMMARY OF THE INVENTION

To solve these problems of the prior art, the present invention provides a cleaning device for cleaning multiple elongate electrodes of an ion optical multipole device, such as a multipole device of a mass spectrometer, the cleaning device comprising at least one substantially longitudinal cleaning section and at least one handling section extending axially from the at least one cleaning section, wherein the at least one cleaning section has a larger cross section than the at least one handling section.

By providing a cleaning device having a substantially longitudinal cleaning section with an axially extending handling section, it is possible to insert the cleaning device in the space between the electrodes of a multipole device and clean the electrodes without taking the multipole device apart. That is, to be suitable for cleaning the electrodes, the cleaning device is arranged such that it can be inserted between the electrodes, and the longitudinal design of the cleaning device makes insertion possible. This removes the need to take the multipole device apart and to realign the electrodes after reassembly.

The at least one cleaning section has a larger cross section than the at least one handling section, such that any contact between the cleaning device and the electrodes of the multipole device is mainly or exclusively at the cleaning sections. This ensures that the contact between the device and the electrodes is only in the desired areas of the device, that is, in the cleaning areas, while any unnecessary friction between the handling section (or handling sections) and the electrodes is avoided.

The inventive device further comprises at least one direction section extending axially from the at least one cleaning section. The at least one direction section is capable of allowing a longitudinal movement of the device in a first axial direction and resisting a longitudinal movement of the device in a second, opposite axial direction. Such a direction section is designed to provide the device a preferred direction of insertion by generating less friction in one direction than in the opposite direction. This, in turn, causes the device to be moved through a multipole device in one direction only, thus moving any removed deposits in a single direction out of the multipole device.

The cleaning sections may have a shape which is suitable for contacting and cleaning the surfaces of the electrodes. For example, at least one cleaning section may have a substantially polygonal cross-sectional shape, such as square, hexagonal or octagonal. Alternatively, or additionally, at least one cleaning section has a substantially circular cross-sectional shape or a substantially elliptical cross-sectional shape. The actual shape chosen may also depend of the number of electrodes of the multipole device (for example quadrupole, hexapole or octopole) and/or their mutual orientation.

In embodiments in which the cleaning device comprises at least two cleaning sections, two cleaning sections may have different cross-sectional shapes and/or different cross-sectional dimensions. That is, not all cleaning sections need to have the same cross-sectional shape and/or the same cross-sectional dimensions. The shape and/or dimensions of a cleaning section may depend on whether a cleaning liquid is applied to the particular cleaning sections, and on which cleaning liquid is applied, for example. However, in embodiments in which the device comprises at least two cleaning sections, it is also possible that two cleaning sections have identical cross-sectional shapes and/or cross-sectional dimensions. It will be understood that in embodiments in which the device comprises three cleaning sections, two cleaning sections may have identical cross-sectional dimensions and/or shapes while one cleaning section has different cross-sectional dimensions and/or a different shape.

In advantageous embodiments, the device comprises two or more cleaning sections separated by at least one spacing section, wherein the at least one spacing section has a smaller cross section than the cleaning sections. A spacing section serves to space the cleaning sections and hence any cleaning liquids applied to those cleaning sections apart.

The cleaning sections may be designed in several different ways. In an embodiment, at least one cleaning section comprises a series of cleaning elements protruding from a body, preferably a longitudinal body, such as a shaft. That is, in such an embodiment a cleaning section comprises a number of substantially separate cleaning elements. In other embodiments, however, a cleaning section may be constituted by a single element, for example a substantially tubular element made of leather or another suitable material.

In an embodiment in which at least one cleaning section comprises a series of cleaning elements protruding from the body, the cleaning elements may comprise cleaning flanges. Such cleaning flanges may be constituted by, for example, disc-shaped elements. At least some cleaning flanges may protrude from the body substantially perpendicularly. In some embodiments, however, at least some cleaning flanges protrude from the body at an acute angle, so that the cleaning flanges have an inclination in a certain direction, which is preferably the opposite of the direction in which the device is inserted into the multipole device so as not to cause too much friction.

At least some cleaning flanges may be substantially planar, so that the cleaning flanges may be constituted by flat discs, for example. However, at least some cleaning flanges may be curved. Curved cleaning flanges may be convex or concave. A specific curvature may be chosen to increase or decrease the area of the cleaning flanges that contacts the electrodes.

In a suitable embodiment, at least one cleaning section is arranged to be compressible. Compressible cleaning sections allow the device to be easily used in different multipole devices having different dimensions, in particular multipole devices in which the cross-sections of the internal channel or space defined by the parallel elongate electrodes differ. In addition, if the compressible cleaning sections are resilient, the pressure with which the cleaning sections contact the surface areas of the electrodes is increased, resulting in an improved cleaning action.

At least one cleaning section may be capable of absorbing and releasing a cleaning liquid. This allows a cleaning liquid to be absorbed by a cleaning section before the device is inserted into the multipole device and allows the cleaning liquid to be released after insertion, for example when the cleaning section which absorbed the liquid is compressible. Such a mechanism makes it possible to use the device to bring cleaning liquid into the multipole device.

The cleaning sections may be made of different materials, depending on their particular shape, structure and purpose. In certain embodiments, at least one cleaning section comprises cellulose. When a cleaning section comprises cleaning discs, for example, those cleaning discs may advantageously be made of cellulose. It will be understood that different cleaning sections may be made of different materials, and that even two or more different materials may be used in a single cleaning section. Other materials which may advantageously be used are natural or synthetic leather or various plastics, for example.

In a particularly advantageous embodiment, the device comprises three cleaning sections separated by spacing sections. The spacing sections may have a smaller diameter than the cleaning sections and may have a length ranging from a few millimeters to a few centimeters, for example. A device having three consecutive cleaning sections is particularly suitable for applying a first cleaning liquid, such as water, using the first cleaning section to be inserted, applying a second cleaning liquid, such as an organic or other solvent, to remove the water using the second cleaning section, and drying using the third cleaning section. The deposits on the electrodes are largely soluble in water. In embodiments, an additive may be added to the water, for example soap. A suitable solvent is isopropanol, although the invention is not limited to this particular solvent. The solvent is primarily used to remove the water. In some embodiments, pure or substantially pure water is used. In other embodiments, mixtures of water and a solvent are used, instead of or in addition to the pure water. For example, a mixture of 70% water and 30% solvent (such as isopropanol) may be applied on the first cleaning section, and a mixture of 30% water and 70% solvent on the second cleaning section. Other ratios may, of course, also be used, for example 80% water and 20% solvent on the first cleaning section, and 20% water and 80% solvent on the second cleaning section, or 90% and 10% combined with 20% and 80%, as the ratios of water and solvent need not be each other's inverse.

It will be understood that other sequences than the sequence of applying water, applying solvent and drying are also possible, and that embodiments of the device can be envisaged which have more than three cleaning sections, such as four, five, six, seven, eight, nine or ten cleaning sections, for example. In such embodiments, two or more different solvents could be used, and/or water with and without an additive and/or solvent, and/or water and solvent in various mixing ratios, and/or more than one dry cleaning section. As mentioned above, embodiments having two cleaning sections or only a single cleaning section are also possible.

Various embodiments of the one or more direction sections are possible. In some embodiments, the direction section comprises at least one flexible element protruding from the body and at least one blocking element arranged adjacent the flexible element for blocking any bending of the flexible element in the direction of the blocking element. The blocking element prevents bending of the flexible element in one direction but does allow bending of the flexible element in the other direction. The flexible element may comprise a flange having a larger cross section than the blocking element.

The cleaning device of the invention may have a single handling section, at one end of the cleaning device, or two handling sections, at either end of the device. At least one of the handling sections may be substantially longer than the cleaning sections combined, for example at least twice as long. It is preferred that at least one handling section is at least as long as the electrodes to be cleaned. This allows for easy handling of the cleaning device. It is noted that in some embodiments the cleaning sections combined may be at least as long as the electrodes to be cleaned. In such embodiments, the handling sections may be relatively shorter.

The at least one handling section may be substantially rigid or substantially flexible. In an embodiment, the handling section comprises a substantially stiff rod, which may also be referred to as handle. This allows the handling section or handle to be easily pushed through the multipole device until it appears at the opposite end of the arrangement, from where it can be pulled. In some embodiments, however, the handling section may comprise a substantially flexible element, such as a cord or rope, which may be passed through the internal channel between the electrodes using an additional tool, for example.

In an embodiment the device comprises two handling sections, one handling section at one end of the cleaning sections being at least five times as long as the other handle section at the opposite end of the one or more cleaning sections, preferably at least ten times as long. This facilitates the insertion into and removal from a multipole device. As mentioned above, it is preferred that at least one handling section has a length at least equal to the length of the electrodes to be cleaned, or at least equal to the length of the multipole device to be cleaned. This ensures that a handling section inserted into a multipole device at one end will emerge from the other end when passed through, so as to be able to be pulled from the other end. The person skilled in the art, wanting to clean a particular multipole device, can easily determine a suitable length of the device of the invention.

Similarly, it is preferred that at least one cleaning section has a cross-section exceeding the inscribed diameter of the multipole device electrodes to be cleaned. That is, the cross-sectional dimensions of the at least one cleaning section are selected in such a way that the cross-sectional dimensions are larger than the cross-sectional dimension of the internal channel between the electrodes of the multipole device, said cross-sectional dimension typically being referred to as inscribed diameter. When the cross-section of at least one cleaning section exceeds the inscribed diameter, if only by a few percent, a good contact between the cleaning section and the surfaces of the electrodes is achieved. The at least one cleaning section should exceed the inscribed diameter by between 1% and 50%, for example between 3% and 30%, preferably between 5% and 20%, more preferably between 5% and 10%. The person skilled in the art, wanting to clean a particular multipole device, can easily determine a suitable diameter of the device of the invention.

The invention additionally provides a method of cleaning electrodes of a mass spectrometer, the method comprising the use of a device as described above.

Further the invention provides a method of cleaning electrodes of a mass spectrometer, the method comprising the use of a device in which the device comprises one substantially longitudinal cleaning section, at least one handling section extending axially from the at least one cleaning section and at least one further cleaning section, wherein the one substantially longitudinal cleaning section has a larger cross section than the at least one handling section, the method further comprising using at least two different cleaning liquids to be applied to at least two respective cleaning sections of the device. That is, a different cleaning liquid may be applied to each cleaning section. In some embodiments, at least one cleaning liquid is water while at least one cleaning liquid may be a solvent. The solvent may be hydrophobic or hydrophilic. The used device can be a device as described above comprising at least two cleaning sections.

In a particularly advantageous embodiment, the cleaning device comprises at least three consecutive cleaning sections, water being applied to the first cleaning section, a solvent being applied to the second cleaning section and no liquid being applied to the third cleaning section. Preferably, such as cleaning device is used in the method of the invention in such a way that the cleaning section to which water is applied enters the internal channel between the electrodes first to dissolve any deposits. Then the cleaning section to which solvent is applied enters to replace the water with solvent. Finally, the dry cleaning section enters the spacing to dry the surfaces of the electrodes. This process may be repeated several times, for example two, three, four, five or six times.

Advantageously, the method of the invention may comprise inserting the device into one end of a multipole device with a handling section first, passing the device through so that the handling section protrudes from the spacing at its other end, and pulling the device from the spacing at its other end.

The present invention is based on the insight that it is undesirable to disassemble a multipole device for cleaning, and that cleaning should therefore be effected by a cleaning device that can be inserted into the multipole device. The present invention benefits from the further insight that the cleaning device should preferably move through the multipole device in one direction only in order to push any deposits out of the multipole device. The present invention also benefits from the still further insight that the cleaning device may have at least two but preferably at least three separate cleaning sections on which preferably at least two different cleaning liquids may be applied respectively, and that any third or further cleaning section may be used for drying the electrodes.

The multipole electrodes which are cleaned in accordance with the invention may be part of a quadrupole device, a hexapole device, an octopole device or another multipole device. In general, the cleaning device and method of the invention may also be used for other parts of a mass spectrometer, such as ion lenses, provided the dimensions of the cleaning device are appropriately chosen.

DETAILED DESCRIPTION OF EXEMPLARY EMBODIMENTS

Figure 1:
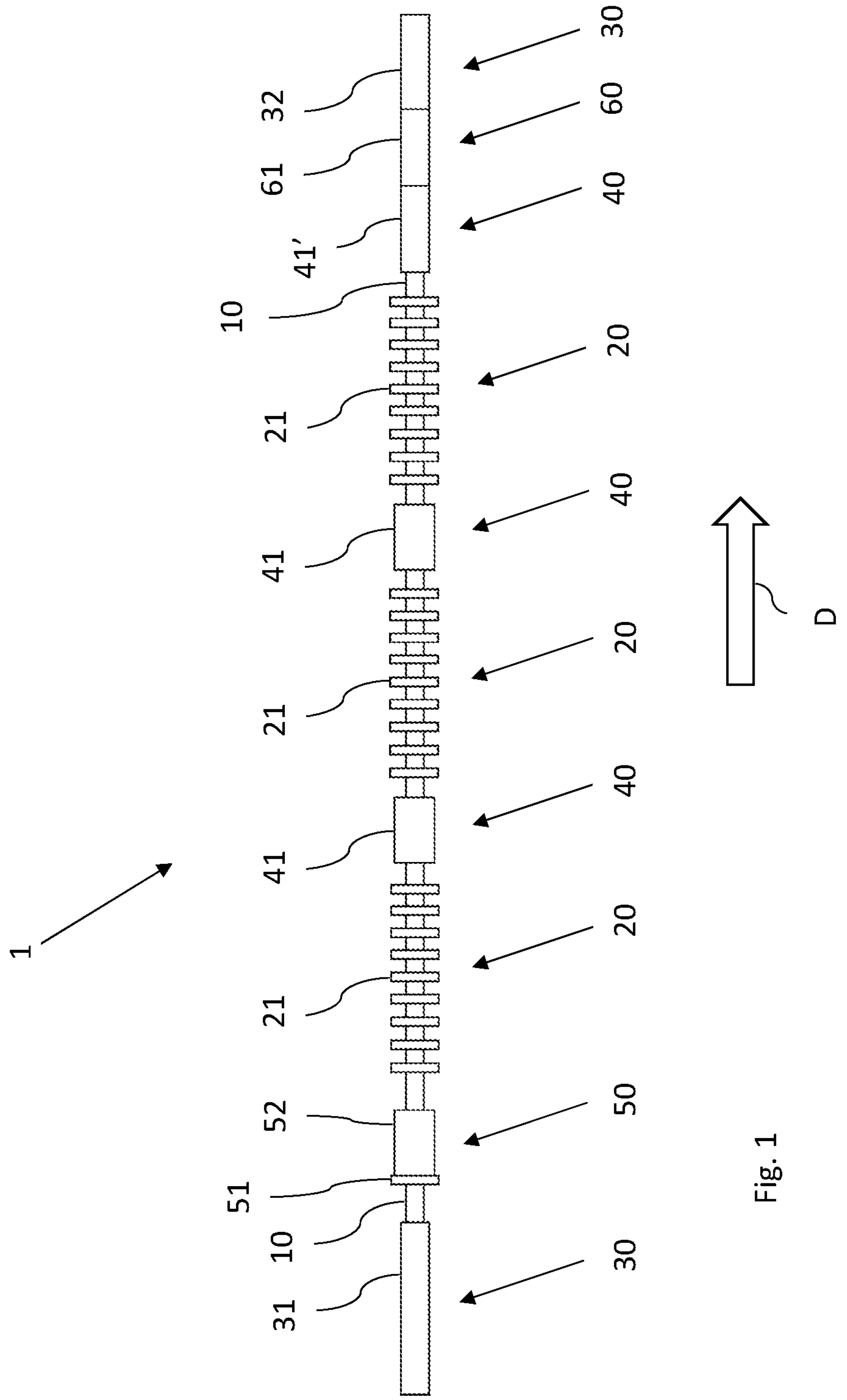
FIG. 1 shows, in a side view, an exemplary embodiment of a cleaning device according to the invention.

The exemplary embodiment of a cleaning device 1 according to the invention which is schematically illustrated in FIG. 1 comprises various sections having different functions. The cleaning device 1 shown has three cleaning sections 20, two handling sections 30, three spacing sections 40, a direction section 50 and a connection section 60. The cleaning sections 20 serve to clean the surfaces of multipole device electrodes, the handling sections 30 serve to handle the cleaning device 1, the spacing sections 40 serve to space the cleaning sections 20 apart, the direction section 50 serves to impose a preferred direction-of-use upon the cleaning device 1, while the connection section 60 serves to releasably connect one handling section, which in this embodiment is the longest handling section, to the other sections of the device.

The cleaning device 1 is shown to have a body constituted by a longitudinal shaft 10 which extends from the first handling section 30 to the connection section 60, through the intermediate cleaning sections 20, spacing sections 40 and direction section 50. The longitudinal shaft 10 may consist of a single piece of material, for example plastic or metal. It can be seen in the example shown that the shaft 10 has a smaller cross-sectional diameter than all other parts of the cleaning device 1.

In the embodiment shown in FIG. 1, handling sections 30 are provided at both ends of the device 1. In this embodiment, one handling section is considerably longer than the other handling section. In particular, a relatively short handle 31 constitutes the handling section bordering the direction section 50, while a relatively long handle 32 (of which only a part is shown) is connected via the connection section 60. The relatively short handle 31 may have a length of, for example, between 1 and 5 cm, such as 1.5 or 2 cm, while the relatively long handle 32 may have a length of, for example, between 20 cm and 50 cm, for example approximately 35 cm or 40 cm. As the relatively long handle 32 serves to pull the device 1 through an ion optical multipole device or other mass spectrometer component having longitudinal electrodes, its length should be such that the total length of the device 1 is at least be equal to the length of the electrodes to be cleaned but preferably greater. Thus, if the electrodes to be cleaned have a length of 40 cm, for example, the length of the cleaning device 1 should be more than 40 cm, for example 50 cm. Preferably, the length of the longest handle (32 in the example shown) should be at least equal to the length of the electrodes to be cleaned, or even at least equal to the length of the multipole device, if the multipole device has a greater length than its electrodes. The person skilled in the art will therefore select a suitable handle length dependent on the length of the electrodes and/or the multipole device to be cleaned.

The cross-sectional diameter of the handles 31 and 32 is in the embodiment shown greater than the cross-sectional diameter of the shaft 10 but smaller than the cross-sectional diameter of the cleaning sections 20. Having a smaller cross-sectional diameter than the cleaning sections avoids any unnecessary friction to be caused by the handles.

Embodiments can be envisaged in which a handling section is provided at one end of the device only. However, having a handle at both ends of the device makes the device easier to use. The handles may be made of plastic, for example.

In the embodiment shown, the cleaning device 1 has three cleaning sections 20. In some embodiments, the device may have less or more cleaning sections, for example only one or two cleaning sections, or four or more cleaning sections. Having at least three cleaning sections provides advantages for certain applications, as will be explained later.

In the embodiment of FIG. 1 each cleaning section 20 comprises a series of flanges 21 which extend substantially perpendicularly from the shaft 10 which constitutes the body of the cleaning device 1. The flanges 21 of each cleaning section are spaced apart so as to allow them to bend when in use. The mutual spacing of the flanges within each cleaning section is, in the embodiment shown, greater than the thickness of the flanges, to allow bending of the flanges 21. It has been found that cellulose is a particularly suitable material for the flanges 21. However, other materials, such as leather, cloth and/or sponge (either artificial or natural) may also be used. Suitable materials may be able to absorb liquid to some extent and release the liquid when the cleaning device is inserted into the internal channel of a multipole device.

As can be seen, the flanges 21, when not in use, have a greater cross-sectional diameter than all other parts of the device 1. This ensures that in use other parts of the device will not make contract with the electrodes to be cleaned and will therefore cause no unnecessary friction or damage.

In the embodiment of FIG. 1, all three cleaning sections 20 have a similar structure of about six to ten flanges each, the cleaning section 20 nearest to the handle 31 having the largest number of flanges. The number of flanges per cleaning section may range from about four to about twenty and is preferably about ten to fifteen. The cleaning sections 20 may have mutually different structures. For example, only one or two cleaning sections could have flanges, while one or more other cleaning sections may have another structure, for example one without flanges, such as a tubular compressible structure. Such a tubular compressible structure may be made of cellulose, foam or leather, for example. In some embodiments, all cleaning sections may have another structure than shown in FIG. 1 and may for example have no flanges, although flanges have been shown to be effective. Structures having a similar effect to flanges, such as ribbed resilient structures, may alternatively or additionally be used. The cleaning sections 20 have in the embodiment shown identical cross-sectional diameters, but this is not necessary. In some embodiments, therefore, the cross-sectional diameters of the cleaning sections may vary between and/or within sections.

The cleaning sections 20 are spaced apart by spacing sections 40 which, in the embodiment shown, each comprise a spacing element 41. The spacing elements 41 may be constituted by tubular elements through which the shaft 10 passes, or by widened parts of the shaft 10, for example. The spacing sections 40 serve to facilitate applying any liquids to the cleaning sections and to provide a time delay between the use of the various liquids when the cleaning device is passed between electrodes.

The direction section 50, which provides a preferred direction D in which the device 1 may be passed between electrodes, is shown to comprise a flange 51 and a blocking element 52. The flange is flexible and may therefore bend when the device is used, but due to the blocking element 52, which is arranged immediately adjacent the flange 51, the flange can bend in one direction only, away from the blocking element 52. As a result, the flange 51 will cause little friction when bent away from the blocking element 52 but significantly more friction when bent towards the blocking element 52. In this way, a preferred direction-of-use D is obtained.

A direction section 50 may comprise more than one flange 51 and more than one blocking element 52. The cross-sectional diameter of the flange 51 may be identical to the cross-sectional diameter of the flanges 21, but may also differ, for example be greater so that the directional effect is greater.

In an embodiment, the diameter of a flange 21 may be approximately 9 mm, while a spacing section has a diameter of approximately 7 mm and the body 10 may have a diameter of approximately 4 mm. Other diameters are of course possible, and the outer cross-sectional diameter of the flanges 21 will depend on the dimensions of the ion optical multipole device to be cleaned, in particular on the diameter of the internal channel defined by the electrodes.

A connection section 60 connects the handle 32 with the body 10 of the device. The connection section 60 comprises a connection element 61 which may contain a screw thread so that the handle 32 can be removable. In some embodiments the handle 32 may be integrally formed with the body 10, in which case the connection section 60 is omitted. In some embodiments, the further spacing element 41' adjacent the connection section may be omitted. In some embodiments, therefore, the handle 32 may be arranged immediately adjacent a cleaning section 20.

Figure 2:
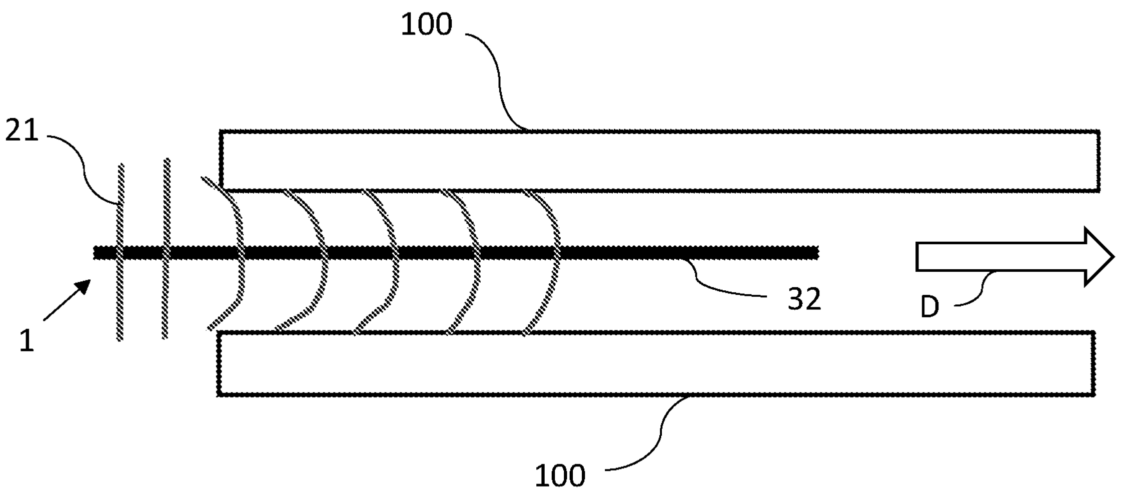
FIG. 2 schematically shows, in a cross-sectional view, how a cleaning device according to the invention can be inserted between the electrodes of an ion optical multipole device.

FIG. 2 schematically illustrates how a cleaning device according to the invention may be used to clean electrodes of an ion optical multipole device, such as a mass filter or similar device. A cleaning device 1 is passed between electrodes 100 of an ion optical multipole device in a forward direction D. As the cleaning device 1 enters the space (that is, the internal channel) between the electrodes 100, the flanges 21 of the cleaning device 1 are bent so that they press against the outer surfaces of the electrodes. This pressure increases the contact surface area between the flanges 21 and the electrodes 100 and improves the cleaning action of the flanges.

It can also be seen from FIG. 2 that the overall length of the cleaning device 1 should be at least equal to the overall length of the electrodes 100, but that preferably a handle of the cleaning device 1 should be longer than the electrodes, so as to allow an easy handling of the cleaning device.

Figure 3:
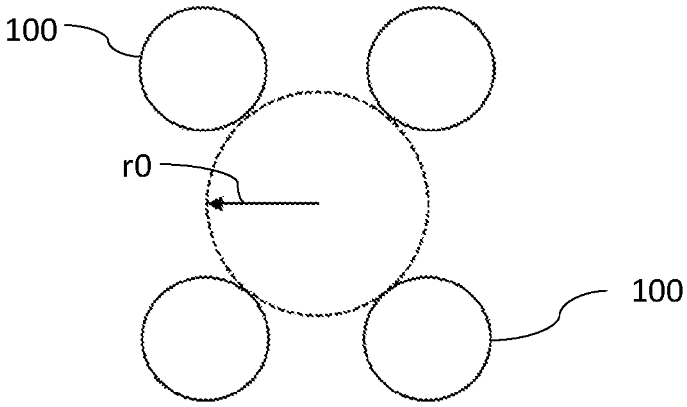
FIG. 3 schematically shows, in front view, the space between the electrodes of an ion optical multipole device.

FIG. 3 is a front view of electrodes 100, in the case shown a quadrupole arrangement. The dimensions of the circular space between the electrodes are defined by the so-called inscribed diameter, which is twice the so-called inscribed radius r0. A circle having a diameter equal to twice the inscribed radius r0 will fit exactly between the electrodes 100. Referring to FIG. 2 again, it will be clear that a cleaning device having a cross-sectional diameter equal to twice the inscribed radius r0 will not exert any significant force on the electrodes 100. For this reason, the cross-sectional diameter of the cleaning sections of the cleaning device should in use be larger than the inscribed diameter, for example at least 5% larger, but preferably at least 10% larger. The extent to which the cross-sectional diameter of the cleaning device exceeds the inscribed diameter may also depend on the material of the cleaning sections. Cleaning sections made of softer materials and/or materials having a low resilience may need to exceed the inscribed diameter by a greater amount than harder materials and/or materials having a high resilience, for example. Cleaning sections on which a liquid is applied before use may swell due to absorption of the liquid and may, when dry, not exceed the inscribed diameter. Other cleaning sections may shrink due to the application of a liquid, in which case their diameters, when dry, should exceed the inscribed diameter.

Figure 4:
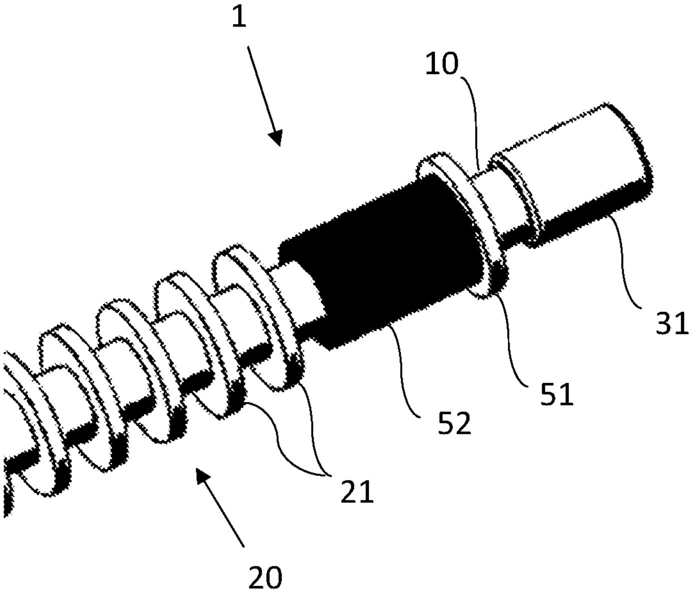
FIG. 4 schematically shows, in a perspective view, part of an exemplary embodiment of a cleaning device according to the invention.

One end of a cleaning device 1 according to the invention is shown in more detail in FIG. 4. The cleaning device 1 is shown to comprise a cleaning section 20 having flanges 21, a direction section comprising a flange 51 and a blocking element 52, and a handle 31. It can be seen that the direction section flange 51 is arranged immediately adjacent the blocking element 52, thus preventing the flange 51 to bend towards the blocking element 52. As can be seen, the flange 51 is capable of bending the other way, away from the blocking element 52. Although only a single direction section is shown in FIGS. 1 and 4, in some embodiments more than one direction section may be provided, for example two, three or four direction sections, to increase the directional preference of the device and to avoid inserting the device in the incorrect direction.

In FIG. 4, both the direction section flange 51 and the cleaning section flanges 21 are shown to consist of substantially flat discs which extend substantially perpendicularly from the body 10 of the device 1. However, this is not essential and in other embodiments, the flanges may have different shapes and/or may extend at another angle than approximately 90° from the body of the cleaning device. The angle at which flanges, or other objects, may protrude from the body may be less than 90°, for example between approximately 30° and 60°, for example approximately 45°.

Figure 5:
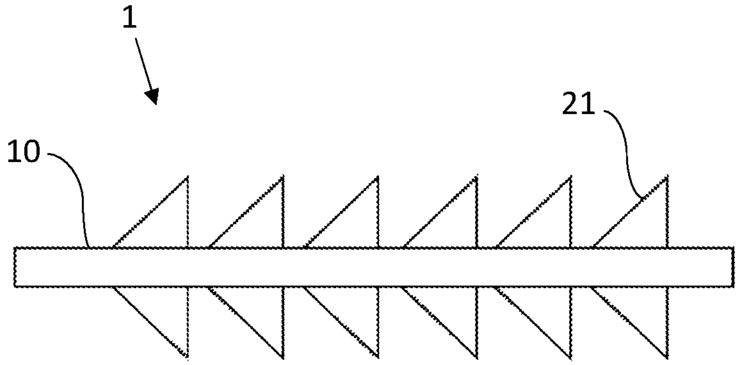
FIG. 5 schematically shows, in a cross-sectional view, an alternative embodiment of a cleaning section of a cleaning device according to the invention.

An example of flanges extending at another angle than 90° is shown in FIG. 5, where flanges 21 extend at an angle of approximately 45° from the body 10 of the cleaning device 1 (of which for the sake of clarity of the drawing only part is shown). In the embodiment shown, the flanges 21 are not constituted by substantially flat discs but by substantially conical structures. In such an embodiment, the flanges 21 provide a preferred direction of insertion, in which case the direction section (50 in FIG. 1) may be omitted. However, in some embodiment both flanges providing a preferred direction and a direction section may be present.

In some embodiments, at least one cleaning section may not have flanges but may have an alternative structure, for example consisting of a tubular sheath of a suitable material, such as cellulose, foam or leather.

Figure 6A:
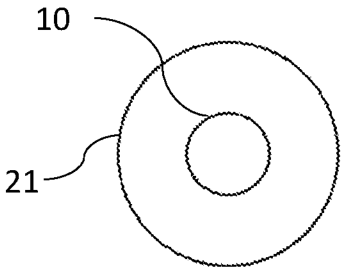
FIGS. 6A-6D schematically show, in front view, various embodiments of cleaning sections of a cleaning device according to the invention.
Figure 6B:
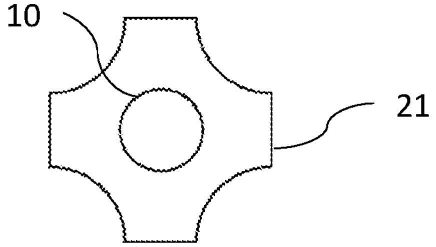

Examples of various cross-sectional shapes of cleaning sections and/or their flanges are schematically illustrated in FIGS. 6*a* to 6D. FIG. 6A shows a substantially circular cross-section of a flange 21 arranged on a body 10. The advantage of this cross-sectional shape is that it is suitable for cleaning various electrode arrangements, such as quadrupoles, hexapoles and octopoles, for example. The embodiment of FIG. 6B, having a basically square cross-sectional shape from which the four corners have been replaced with concave cut-outs, is particular suitable for cleaning a quadrupole arrangement as it will be able to reach a larger part of the surface of the quadrupole electrodes.

Figure 6C:
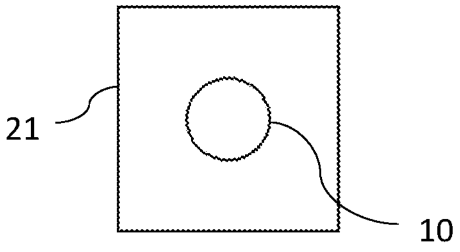
Figure 6D:
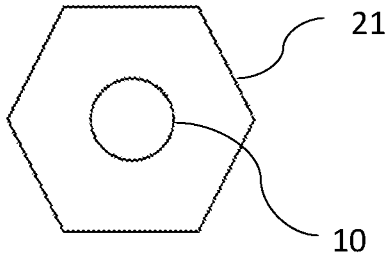

The substantially square cross-sectional shape of the embodiment of FIG. 6C is also suitable for cleaning quadrupole devices. The substantially hexagonal cross-sectional shape of the embodiment of FIG. 6D is particularly suitable for cleaning hexapole arrangements. It will be understood that other cross-sectional shapes are also possible.

Figure 7A:
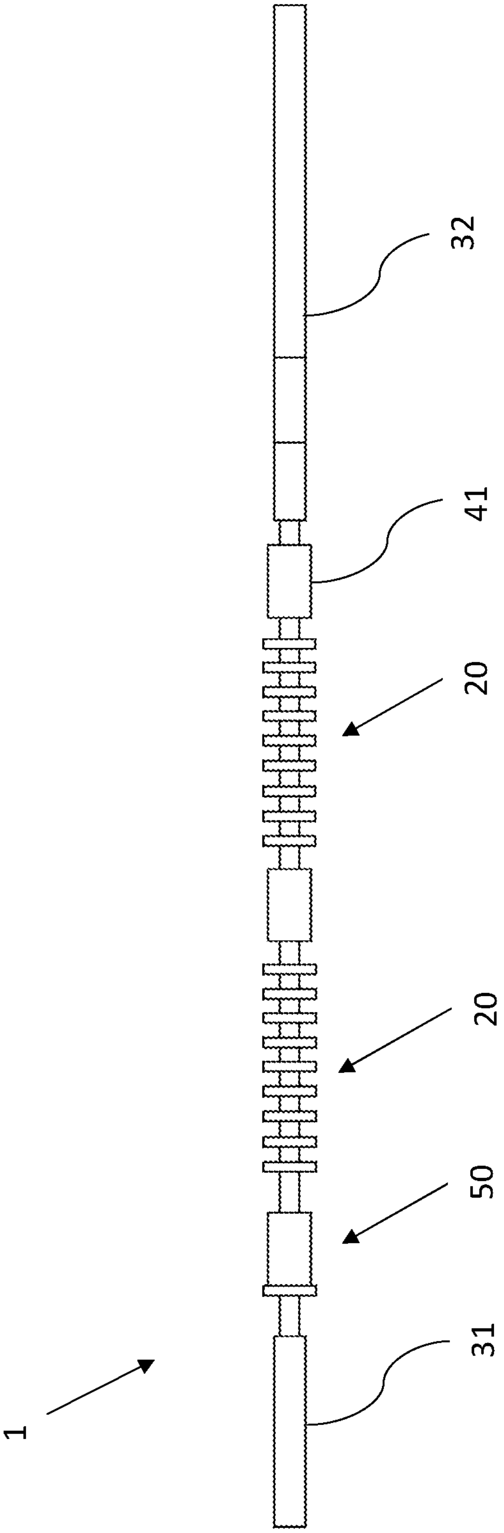
FIGS. 7A & 7B schematically show alternative embodiments of a cleaning device according to the invention.
Figure 7B:
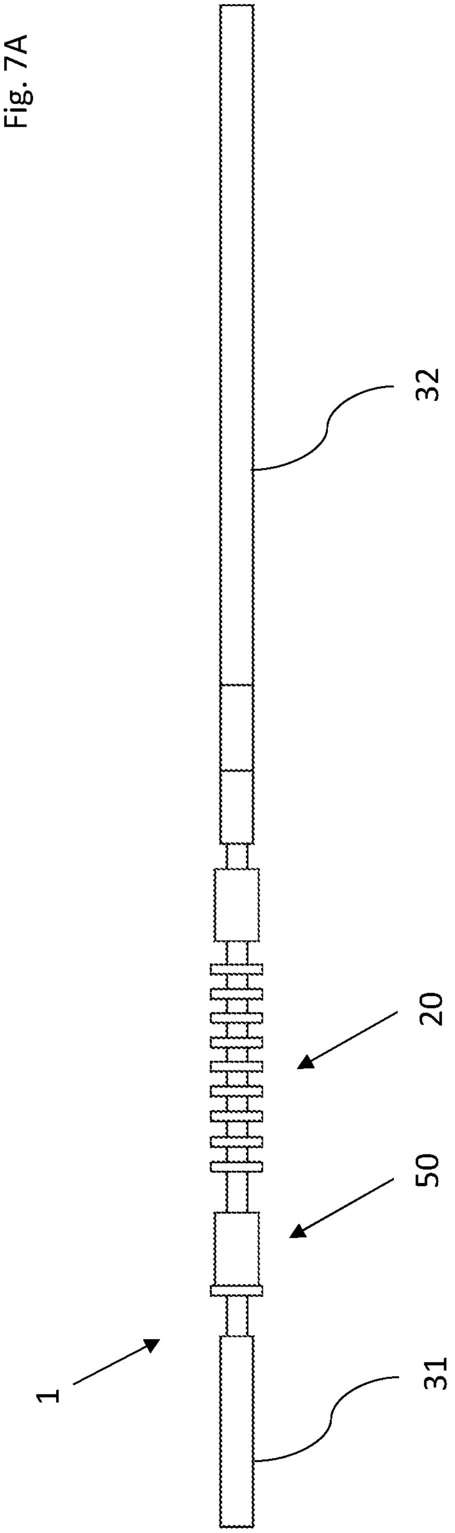

The embodiment of the cleaning device shown in FIG. 1 has three cleaning sections (20 in FIG. 1). As mentioned above, other embodiments may have more or less than three cleaning sections. The exemplary embodiment of FIG. 7A, for example, has two cleaning sections 20, but is otherwise identical to the embodiment of FIG. 1. The exemplary embodiment of FIG. 7B has only a single cleaning section 20 but is also otherwise identical to the embodiment of FIG. 1.

Figure 8:
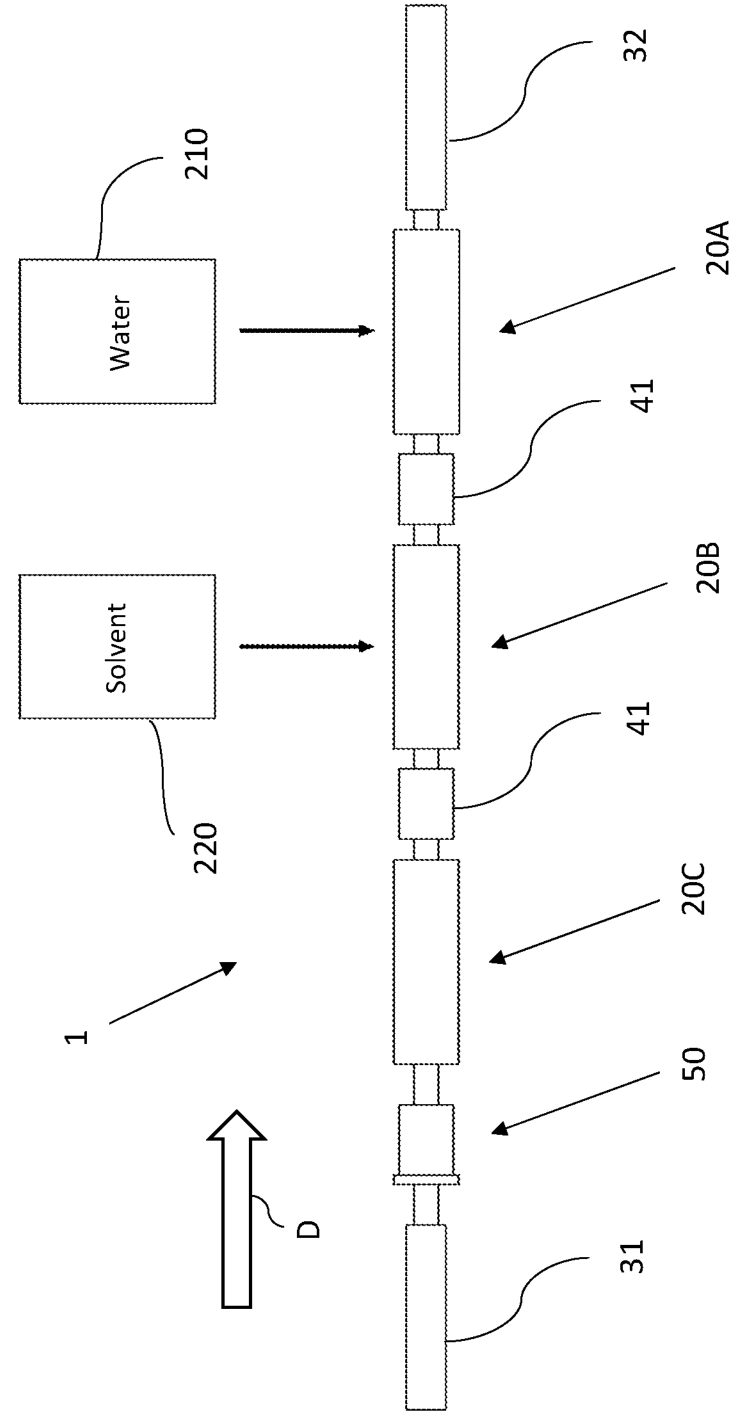
FIG. 8 schematically shows how different liquids may be applied to a cleaning device according to the invention.

A particular advantageous use of the cleaning device of the invention is illustrated by FIG. 8, in which a cleaning device 1 according to the invention is shown to comprise a first handle 31, a direction section 50, cleaning sections 20, spacing elements 41 and a second handle 32 (of which only part is shown). In the embodiment shown, the device 1 comprises three cleaning sections 20 which have no flanges but are constituted by tubes of absorbing material, such as foam or leather. The use of the cleaning device illustrated in FIG. 8 is equally well possible with a cleaning device of which at least one cleaning section comprises flanges, for example.

Advantageously, the device 1 is used together with a water supply 210 and a solvent supply 220. The direction section 50 is arranged in such a way that the preferred direction of insertion of the device between electrodes of an ion optical multipole device is with the (second) handle 32 first, so in the direction D. Water is applied to the first cleaning section 20A which is to be in contact with the electrodes, while a solvent is applied to the second cleaning section 20B. The cleaning sections 20A and 20B are therefore arranged to absorb some liquid and are made of a liquid absorbing material. In the embodiment shown, no liquid is applied to the third cleaning section 20C, although in some embodiments a third liquid may be applied to the third cleaning section 20C.

When the device 1 is inserted in the space between electrodes (see FIG. 2, for example), the compression of the cleaning sections by the electrodes of the multipole device leads to at least some release of the respective absorbed liquid. Thus, in the embodiment shown, first the water is applied to the electrodes, then the water is replaced with solvent, and subsequently the electrodes are dried by the dry cleaning section, that is, the cleaning section 20C to which no liquid was applied.

It will be understood that the invention is not limited to applying two liquids and using a single dry cleaning section. Only a single liquid may be applied on a single cleaning section, one other cleaning section being used for drying. When using a device having only a single cleaning section, the drying may be dispensed with.

The solvent may be a suitable organic solvent (that is, a carbon-based solvent) such as an alcohol, ether, or ester, an aliphatic or aromatic solvent, or any other suitable solvent. The water may be distilled high-purity water. In some embodiments, the cleaning liquids are mixtures of water and a solvent, with various mixing ratios. Cleaning liquids, such as water, may contains surfactants. Cleaning liquids containing surfactants are preferably followed by pure water and are preferably then followed by a solvent.

Solvents may be selected on the basis of their compatibility with the materials from which the cleaning device is made, and vice versa.

Figure 9:
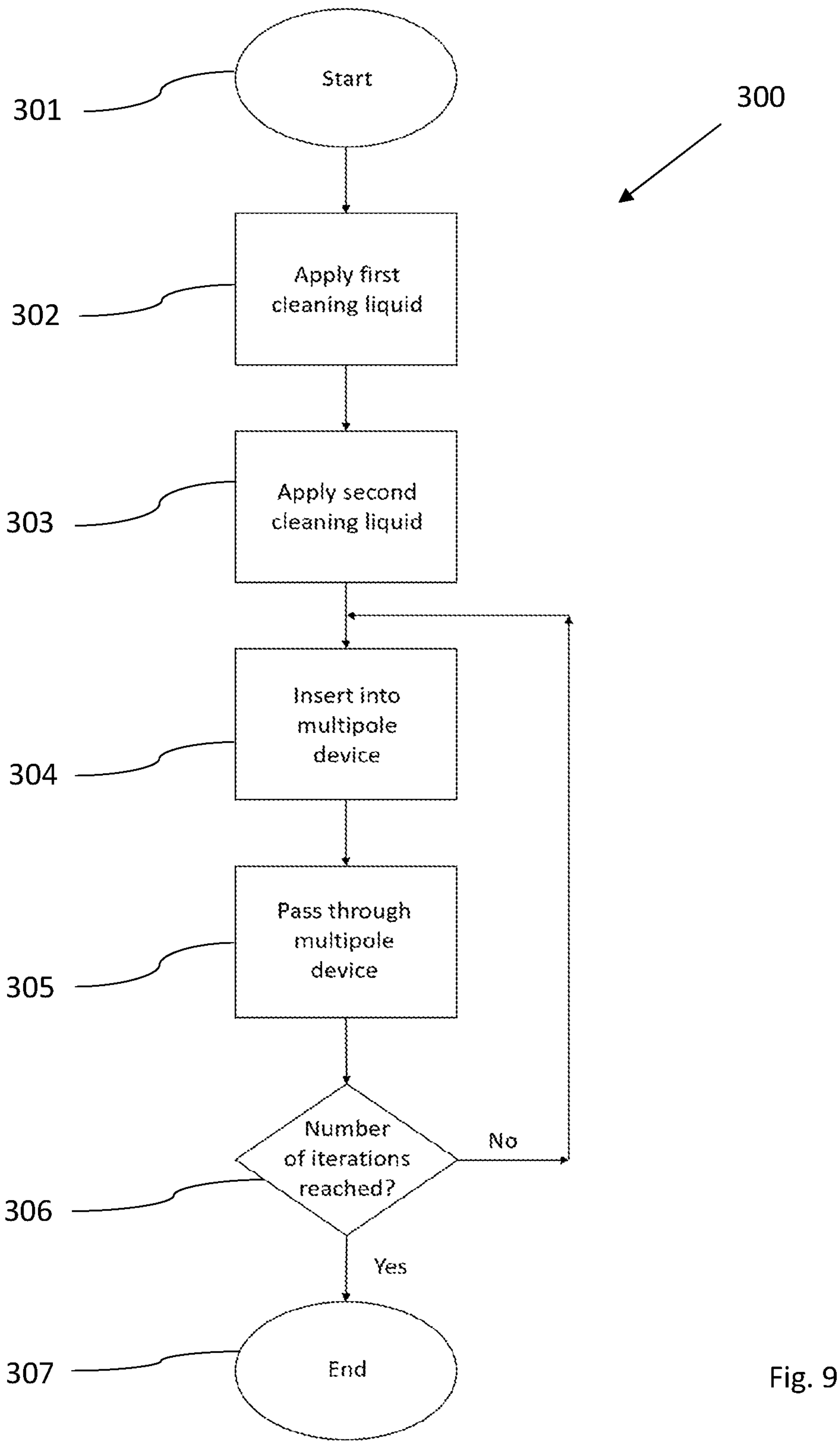
FIG. 9 schematically shows an exemplary embodiment of a cleaning method according to the invention.

The exemplary embodiment of a method 300 according to the invention which is schematically illustrated in FIG. 9 starts at step 301 when the method is initiated. At step 302, a first cleaning liquid, such as a water, is applied to a first cleaning section of a cleaning device according to the invention, as discussed above with reference to FIG. 8. At step 303, a second cleaning liquid, such as a solvent, is applied to a second cleaning section. In this embodiment, no liquid or other substance is applied to a third cleaning section of the device, if present. This concludes the preparation of the cleaning device.

At step 304, the cleaning device is inserted into the space between the electrodes of an ion optical multipole device or similar device. It is inserted so far that one end of the cleaning device emerges at the far end of the electrodes, so that the cleaning device can be passed through the space between the electrodes of the multipole device at step 305.

These steps may be carried out more than once, for example two, three, four, five or more than five times, such as ten times or even fifty times. The steps 304 and 305 may be carried out as many times as necessary to get a certain result, which may be determined by visual detection or automatic detection (involving image processing, for example). In a preferred embodiment, a predetermined number of iterations is carried out, preferably three. Each time the cleaning device emerges from the multipole device, at step 306 it is checked whether the predetermined number of iterations has been reached. If this is the case ("Yes"), the method ends at step 307. If the predetermined number of iterations has not been reached ("No"), the method returns to step 304 where the cleaning device is inserted into the multipole device. In some embodiments, not only steps 304 and 305 may be repeated, but steps 302 (applying the first cleaning liquid) and 303 (applying the second cleaning liquid) as well. In some embodiments, therefore, step 302 may follow a "No" decision in step 306. In certain embodiments, a "No" decision in step 306 leads back to step 302 if a first condition is fulfilled (for example an even number of iterations has been carried out) and leads back to step 304 if a second condition is fulfilled (for example an odd number of iterations has been carried out). This results in cleaning liquids being applied, but not each time the cleaning device is inserted into the multipole arrangement. Other variants of the method of the invention are also possible.

After cleaning the electrodes of a multipole device, the cleaning device may be discarded. Some embodiments of the cleaning device may be suitable for multiple use.

This embodiment of the method according to the invention is given by way of example only. It will therefore be understood by those skilled in the art that the invention is not limited to the embodiments described above and that many additions and modifications may be made without departing from the scope of the invention as defined in the appending claims.

The invention claimed is:

1. A cleaning device for cleaning multiple elongate electrodes of an ion optical multipole device, the cleaning device comprising:

at least one substantially longitudinal cleaning section having a liquid absorbing material for absorbing a first liquid;

a second substantially longitudinal cleaning section having a liquid absorbing material for absorbing a second liquid, one of the first liquid or the second liquid being water and the other being a solvent;

at least one handling section extending axially from the at least one cleaning section; and at least one direction section extending axially from the at least one cleaning section, wherein the at least one cleaning section has a larger cross section than the at least one handling section, and wherein the at least one direction section is arranged to allow a longitudinal movement of the cleaning device in a first axial direction and arranged to resist a longitudinal movement of the cleaning device in a second, opposite axial direction.

2. The cleaning device according to claim 1, wherein at least one cleaning section has a substantially polygonal cross-sectional shape, such as square, hexagonal or octagonal.

3. The cleaning device according to claim 1, wherein at least one cleaning section has a substantially circular cross-sectional shape.

4. The cleaning device according to claim 1, wherein at least one cleaning section has a substantially elliptical cross-sectional shape.

5. The cleaning device according to claim 1, comprising at least two cleaning sections, wherein two cleaning sections have different cross-sectional shapes and/or different cross-sectional dimensions.

6. The cleaning device according to claim 1, comprising at least two cleaning sections, wherein two cleaning sections have identical cross-sectional shapes and/or cross-sectional dimensions.

7. The cleaning device according to claim 1, comprising two or more cleaning sections separated by at least one spacing section, wherein the at least one spacing section has a smaller cross section than the cleaning sections.

8. The cleaning device according to claim 1, wherein at least one cleaning section comprises a series of cleaning elements protruding from a body.

9. The cleaning device according to claim 8, wherein the cleaning elements comprise cleaning flanges.

10. The cleaning device according to claim 9, wherein at least some cleaning flanges protrude from the body substantially perpendicularly.

11. The cleaning device according to claim 9, wherein at least some cleaning flanges protrude from the body at an acute angle.

12. The cleaning device according to claim 9, wherein at least some cleaning flanges are substantially planar.

13. The cleaning device according to claim 9, wherein at least some cleaning flanges are curved.

14. The cleaning device according to claim 1, wherein at least one cleaning section is arranged to be compressible.

15. The cleaning device according to claim 1, wherein at least one cleaning section is capable of absorbing and releasing a cleaning liquid.

16. The cleaning device according to claim 1, wherein at least one cleaning section comprises cellulose, natural or artificial sponge, leather and/or cloth.

17. The cleaning device according to claim 1, comprising three cleaning sections separated by spacing sections.

18. The cleaning device according to claim 1, wherein the direction section comprises at least one flexible element protruding from the body and at least one blocking element arranged adjacent the flexible element for blocking any bending of the flexible element in the direction of the blocking element.

19. The cleaning device according to claim 18, wherein the flexible element comprises a flange having a larger cross section than the blocking element.

20. The cleaning device according to claim 1, wherein the at least one handling section is substantially longer than the cleaning sections combined.

21. The cleaning device according to claim 20, wherein the handling section comprises a substantially stiff rod.

22. The cleaning device according to claim 20, wherein the handling section comprises a substantially flexible element, such as a cord or rope.

23. The cleaning device according to claim 1, comprising two handling sections, wherein one handling section at one end of the cleaning sections is at least five times as long as the other handling section at the opposite end of the one or more cleaning sections, preferably at least ten times as long.

24. The cleaning device according to claim 1, wherein at least one handling section has a length exceeding the length of the electrodes to be cleaned.

25. The cleaning device according to claim 1, wherein at least one cleaning section has a cross-section exceeding the inscribed diameter of the electrodes to be cleaned.

26. A method of cleaning electrodes of an ion optical multipole device, the method comprising the use of a cleaning device according to claim 1.

* * * * *